March 8, 1955     G. K. C. HARDESTY     2,703,547

ILLUMINATING SYSTEM USING FLUID AND SOLID MEDIA

Filed Aug. 28, 1952

INVENTOR.
GEORGE K.C. HARDESTY
BY Wilson R. Maltby

ATTORNEY

United States Patent Office 2,703,547
Patented Mar. 8, 1955

2,703,547

ILLUMINATING SYSTEM USING FLUID AND SOLID MEDIA

George K. C. Hardesty, Mayo, Md.

Application August 28, 1952, Serial No. 306,969

9 Claims. (Cl. 116—129)

(Granted under Title 35, U. S. Code (1952), sec. 266)

The invention described herein may be manufactured and used by or for the Government of the United States of America for governmental purposes without the payment of any royalties thereon or therefor.

This invention relates primarily to illumination of instruments, and more particularly to edge illumination thereof, through an oil filled cavity having edge walls of plastic, of index of refraction approximating the index of refraction of the oil.

Previous arrangements have been suggested employing edge illumination for clocks, meters and other instruments, particularly for use in preserving the night adaptation of the observer's eyes. It is particularly important to an observer in an airplane or on the ground observing the skies at night that any illumination employed be faint, and preferably red in color, so as not to excite the dark-adapted vision. In this connection, it is found that faint red light does not excite the eye elements that must be preserved sensitive to weak light and, hence, does not cause loss of dark-adaptation of the eye. Accordingly, any instruments or equipment which must remain visible to such an observer, is illuminated to minimum practical brightness by red light and only the most essential small portions of such equipment are thus illuminated. Therefore, conventional methods of lighting are entirely inappropriate for such use and special devices are required for the purpose at hand.

The most desirable arrangement of a clock face, for example, causes only the hands of the clock and time indicia on the dial to be lighted, the faces and other background thereof being left invisible.

Accordingly, an object of the invention is to provide an instrument face in which only the indicia and indicator are visible when illuminated for night observation.

A further object of the invention is to provide means for edge illuminating an instrument with a minimum amount of light which will render the indication thereon visible to an observer.

A still further object of the invention is to provide an instrument face in which indicia and indicators are oil immersed and illuminated from the edge in a manner such that the background reflects no light to the observer.

Figure 1:
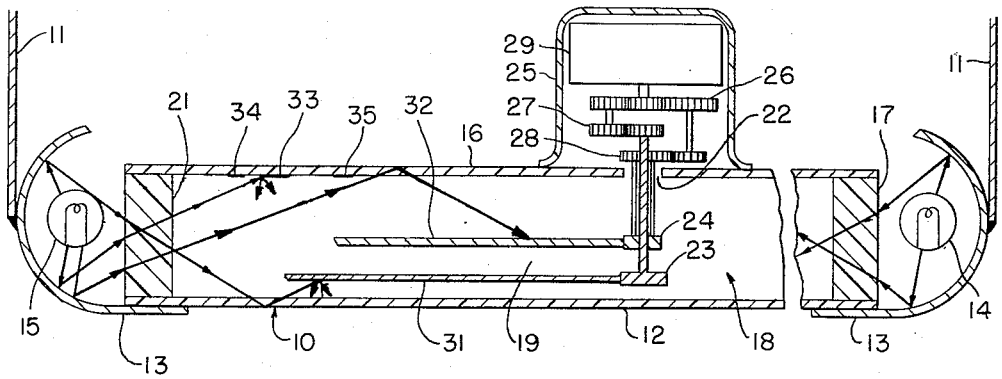
Figure 2:
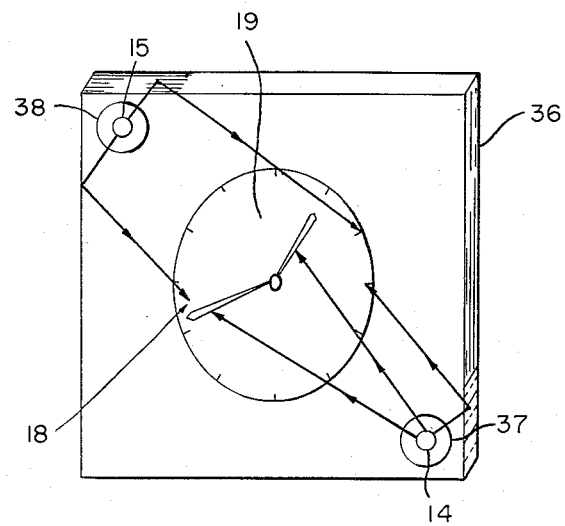

Other objects and many of the attendant advantages of this invention will be readily appreciated as the same becomes better understood by reference to the following detailed description when considered in connection with the accompanying drawings wherein:

Figure 1 is a plan view, partly in section, showing details of an instrument provided with edge illumination according to the invention; and, Figure 2 is a perspective view showing a modified version of an edge illuminated instrument of the invention.

Referring now to the drawings, wherein like reference characters designate like or corresponding parts throughout the several views, there is shown in Fig. 1, an instrument 10 illustrated as a clock having a casing 11 with a transparent face 12 thereon, and having a metallic reflector 13 surrounding the edge of the face of the clock. The reflector 13 is preferably so formed as to reflect light from lamps 14 and 15 toward the center of the instrument. The instrument face is composed of the transparent plate 12, a second transparent plate 16 somewhat back of the first plate, and a transparent ring member 17 cemented between plates 12 and 16 to form a fluid-tight chamber generally designated 18 and which is filled with a liquid 19 as hereinafter described.

The ring 17 is preferably of transparent acrylic, or similar material, having an outer cylindrical surface which is optically smooth. In the preferred embodiment of the invention the inner surface 21 need not necessarily be smooth since it is in contact with liquid 19 of similar optical properties.

The plates 12 and 16 are preferably supplied with optically smooth surfaces on both sides and plate 16 has a central aperture therein at 22 through which suitable drive shafts 23 and 24 are shown extended. A housing 25 of thin non-magnetic material is illustrated as secured in fluid-tight relationship to plate 16 covering aperture 22 and containing the driving mechanisms for shafts 23 and 24, as well as any ratio gears 26, 27, 28, etc. which may be required.

In the preferred embodiment of the invention a rotor 29 fits closely and rotationally within the housing 25 such that a rotating field may be applied in the vicinity thereof immediately outside the housing 25 and arranged to rotate the rotor 29. The rotor 29 and housing 25 exemplify a device similar in function to a "Telechron" motor but of course may be any device suitable for the purpose having a fluid seal between the rotating element and the driving force therefor.

The gears 26, 27 and 28 may be employed for the purpose of reducing the speed of rotation of shafts 23 and 24, or either of them, as may be required, and may be for the further purpose of providing a ratio of speeds between two hands such as employed in a clock driving mechanism. These elements as illustrated in Fig. 1 are representative of "Telechron" reduction gears for providing any desired reductional speed for a clock or other instrument.

Shafts 23 and 24 are illustrated as furnished with hands 31 and 32 cooperating with indicia 33, 34, and 35 formed at the rear wall of the chamber 18, and preferably extending from the plate 16 into the liquid 19. For some purposes it is satisfactory to paint such indicia onto the inner face of the chamber wall so that light is caught and diffused thereby through the front face of the instrument to an observer.

The present invention employs a characteristic of liquid and solid materials in contact with each other wherein two transparent materials of differing density or physical state but having the same, or approximately the same, index of refraction present none of the characteristic optical features of a boundary between two materials of different index of refraction. Thus, it is seen that light passing through the ring 17 toward the liquid 19 may be refracted or deviated as it passes into the ring material. When the liquid 19 is compounded or chosen to have approximately the same index of refraction as the material of the ring the light beam in passing from the ring to the liquid is not deviated or refracted and behaves as though no surface were present. Thus, light within the ring material passes in a straight line on through the liquid until it is stopped or diffused by striking some diffusing object within the chamber 18. In passing through the chamber 18 the light rays from the lamps 14 and 15 or from the reflector 13 are arranged at an angle such that light rays incident upon plates 12 or 16 are totally reflected and no light therefrom is diffused through the face of the instrument. In order to accomplish this it is necessary that the index of refraction of plates 12 and 16 be substantially equal to the index of the liquid 19, the maximum angle of incidence of totally reflected light rays to the plates 12 and 16 being a function of the difference of indices of refraction. Since acrylic materials are generally of lower index than glass it is thus possible to construct a chamber 18 havng front, back and edge walls formed thereof with an index approximating 1.48, for which a number of index-matching oils and synthetic materials is available. Also, the index of refraction may be varied by variably proportioning two ingredients to provide an index approximating 1.48. With oil and plastic indices matched the interface therebetween disappears from view and returns no light to the observer.

It is now apparent that the chamber 18 receives light from a plurality of sources such as 14 and 15, substantially all entering rays from which are retained within the chamber except such rays as emerge at the aperture 22 or strike hands 31 or 32 or indicia 33, 34 or 35. Light passing through the chamber from one side to the opposite side is substantially all reflected back into the chamber by the reflector member 13, and constitutes useful light in that it illuminates the indicating hands and the indicia on the back wall of the instrument 16. Light reflected from these elements passes through the face plate 12 and may be utilized by an observer, without background lighting from any portions of the apparatus.

It will also be noted that the construction as hereinbefore described does not permit the observer to see a lighted wall at the interior of the ring 17 because of the similarity of refractive index of the wall and the liquid retained thereby. The reflector element 13 is preferably extended inwardly on the face 12 sufficiently to form a mask for the instrument face and to absorb any rays from the light sources which enter the chamber at too large an angle of incidence to be fully internally reflected by the plates 12 and 16.

In Fig. 2 there is illustrated a variation of the construction in Fig. 1 wherein a sheet of plastic, glass, or acrylic material 36 has therein a central aperture of size sufficient to receive the indicia and indicating hands. The sheet 36 replaces the ring member 17 of Fig. 1 and the reflector 13. It may be of square or hexagonal shape, or of other shape as may be convenient, but has additional apertures 37 and 38 suitable for receiving lamps 14 and 15 and is equipped with face plates cemented thereto to retain liquid 19 in the chamber 18 surrounding the indicating elements. At high angles of incidence light rays striking the outer edges of the sheet 36 in the immediate vicinity of the lamps are not internally totally reflected. To maintain lighting efficiency the edge areas of the plate 36 in the vicinity of the apertures 37 and 38 may be provided with reflective coatings such as silver or chromium.

In Figs. 1 and 2 there are illustrated typical light rays from the lamps directly entering the acrylic material, or reflected thereinto by the reflector 13, or the edge walls of the sheet 36. Any light rays striking the acrylic material at other than normal incidence will be deviated in the direction toward parallelism with the plates 12 and 16 and, after passage through the acrylic material, will proceed without further deviation into the chamber 18. Typical rays are further shown internally reflected upon striking plates 12 and 16. Any such rays not striking an indicating hand or indicia on the plate 16 will, in general, pass on through the chamber and be reflected back into the chamber at the outer edge walls of the acrylic material.

Whereas the illuminating means herein described is most efficient for preservation and employment of all entering light for useful purposes a considerable advantage over the present art is achieved even though the index of refraction of the liquid 19 is not exactly matched with that of the acrylic material or other light transmitting material forming ring 17 or sheet 36, so long as a substantial matching is achieved. For example it is found that acrylic material of index 1.48 to 1.49 may be used with white mineral oil.

While the invention has been described with particular reference to acrylic materials forming the face and edge walls with matching liquid index, any other transparent material having an index of refraction somewhat less than that of the liquid may, of course, be employed.

Obviously many modifications and variations of the present invention are possible in the light of the above teachings. It is therefore to be understood, that within the scope of the appended claims, the invention may be practiced otherwise than as specifically described.

What is claimed is:

1. In an illuminated instrument adapted for edge illumination thereof, front and back face plate members of transparent material having a first index of refraction, said back member having attached thereto movable indicating means extending therethrough, means operating said indicating means, a spacing ring of transparent material separating said plate members and forming a liquid-tight seal therebetween, a liquid material filling the space between said plate members and surrounding said indicating means, said liquid having a second index of refraction substantially equalling said first index, and means exterior to said ring causing light to enter said liquid through said ring, whereby said indicating means is illuminated without visible illumination of the front and back face plates.

2. In the instrument of claim 1 said back plate member having light-diffusing indicia therein cooperating with said indicating means.

3. In an edge illuminated instrument for night observation, a liquid-tight chamber adapted to display information indicating members and havng front and back walls of transparent material of a first index of refraction and having an edge wall separating said front and back members completing said liquid-tight chamber, at least one light source arranged exteriorly of and adjacent to said edge wall and causing light to enter said chamber, and a liquid filling said chamber, said liquid having a second index of refraction substantially equal to said first index, whereby light entering the chamber is internally reflected by the front and back members at the outer surfaces thereof without diffusion through the face of the instrument.

4. In the instrument of claim 3, baffle means extending around said light source and inwardly along the face of the instrument to mask the region thereof covering said edge wall, thereby to prevent diffusion of light to an observer therefrom.

5. In the instrument of claim 3 an aperture in the back face member, an indicating member of diffusing material rotatively supported in said aperture, and means operating said indicating member, the last said means being sealed in liquid-tight relationship to said back face member adjacent said aperture.

6. In the instrument of claim 3 said edge wall being a ring of acrylic material and said light source being enclosed in a circular reflecting member surrounding said ring of acrylic material.

7. In an edge illuminated indicating instrument, a housing comprising a face mask with an opening therein, a plurality of light sources adjacent to and behind said mask, a face chamber having a transparent face plate behind said mask and said opening, a second transparent plate behind the first said plate member and an edge member of the same material comprising said face plate and said second plate forming a peripheral seal therebetween, a non-viscous liquid filling said chamber, light diffusing indicating arms supported for movement within said chamber, and means actuating said indicating arms in accordance with information displayed.

8. In the instrument of claim 7 said second plate having calibrating indicia of light diffusing character on the inner face thereof, whereby said indicia and said indicating arms are illuminated from said light sources without illumination of said plate members.

9. An instrument having a casing, said casing having a transparent face thereon, a metallic-curved reflector secured about the edge of said transparent face and attached to said casing, a plurality of light sources within said curved reflector so that light rays may be reflected toward the center of said casing, a transparent plate parallel to said transparent face, a transparent ring member positioned between said transparent face and transparent plate and secured thereto to provide a liquid-tight chamber, said transparent ring member having an optically smooth outer surface, a liquid material within the liquid-tight chamber and having an index of refraction substantially equal to the index of refraction of said transparent face and said transparent plate, indicia means secured to said transparent plate and projecting into said liquid material so that light passing through the transparent ring will be stopped or diffused by said indicia means and reflected through said transparent face, said light sources being positioned between said curved reflector and said transparent ring so that light incident upon said transparent plate and said transparent ring are totally reflected to prevent light from being diffused through said transparent face.

References Cited in the file of this patent

UNITED STATES PATENTS

| | | |
|---|---|---|
| 695,606 | Grun | Mar. 18, 1902 |
| 1,495,936 | Warren | May 27, 1924 |
| 1,973,728 | Salzgeber | Sept. 18, 1934 |
| 2,295,802 | Nicoll | Sept. 15, 1942 |
| 2,600,644 | Hand | June 17, 1952 |